United States Patent
Ashmore et al.

(10) Patent No.: US 8,437,026 B2
(45) Date of Patent: May 7, 2013

(54) COMPENSATION FOR FACSIMILE TRANSMISSION IN A PACKET SWITCHED NETWORK

(75) Inventors: Allan Ashmore, North Grafton, MA (US); Maciej Wasiel, Newton, MA (US)

(73) Assignee: Dialogic Corporation, Montreal, Quebec (CA)

( * ) Notice: Subject to any disclaimer, the term of this patent is extended or adjusted under 35 U.S.C. 154(b) by 534 days.

(21) Appl. No.: 12/835,867

(22) Filed: Jul. 14, 2010

(65) Prior Publication Data

US 2012/0013937 A1    Jan. 19, 2012

(51) Int. Cl.
*G06F 15/00* (2006.01)
*G06F 3/12* (2006.01)
*G06K 1/00* (2006.01)

(52) U.S. Cl.
USPC ............................... 358/1.15; 358/1.13

(58) Field of Classification Search .................. None
See application file for complete search history.

(56) References Cited

U.S. PATENT DOCUMENTS

| 5,790,538 | A | 8/1998 | Sugar |
| 6,788,651 | B1 | 9/2004 | Brent et al. |
| 6,952,407 | B2 | 10/2005 | Burke |
| 2003/0223463 | A1* | 12/2003 | Abrishami et al. ............ 370/516 |
| 2010/0329286 | A1* | 12/2010 | Fabian et al. ................. 370/503 |

* cited by examiner

*Primary Examiner* — Douglas Tran
(74) *Attorney, Agent, or Firm* — Preti Flaherty Beliveau & Pachios LLP

(57) ABSTRACT

Communication network components can be synchronized for facsimile transmissions in the communication network. The synchronization may compensate for variations in transmission rates among the different network components or different paths taken by portions of the facsimile transmission. The synchronization may involve modulating an adaptive jitter buffer or an effective packet rate to compensate for clock skew that may occur between network components. The compensation to obtain synchronization can be achieved to avoid causing interruptions or distortions in the facsimile transmission data. By applying the compensation at specific points or intervals in a facsimile transmission, synchronization can be achieved to obtain an overall quality improvement in facsimile transmissions in a packet switched network.

20 Claims, 7 Drawing Sheets

COMPENSATION FOR FACSIMILE TRANSMISSION IN A PACKET SWITCHED NETWORK

CROSS REFERENCE TO RELATED APPLICATION(S)

(Not Applicable)

STATEMENT REGARDING FEDERALLY SPONSORED RESEARCH OR DEVELOPMENT (Not Applicable)

BACKGROUND OF THE INVENTION

The present disclosure relates generally to facsimile transmission through a packet switched network, and more particularly to compensation for network operations related to such facsimile transmissions.

Facsimile document transmission continues to have an important role in business communications for a number of reasons, including the ability to transfer images not stored on a local computer, legal acceptance of handwritten signatures, real-time confirmation of receipt, confidence in what has been sent/received, and the ability to provide a 'tamper resistant' copy of the information transferred. The ubiquitous nature of facsimile-enabled devices on a global scale allows them to easily take advantage of existent telecommunications networks. Such devices also may be shared by a number of individuals so that sending and receiving documents can be relatively efficient among a general population or group of persons.

While facsimile communications have previously been implemented over circuit switched networks, such as the publicly switched telephone network (PSTN), packet switched networks, such as Internet Protocol (IP) networks, have been implemented to carry communications including facsimile communications. As these different types of networks continue to coexist, translation and communication between them has become (and should continue to be) an important part of communications, including facsimile communications.

IP networks are inherently asynchronous, have a higher delay, and are relatively 'lossy' (lose or drop packets) compared to PSTN networks, which typically operate on a time-division multiplexed (TDM) basis. While these characteristics of IP networks are known to adversely impact both voice and facsimile communications, the impact to facsimile communications is typically more pronounced. Various solutions have been provided to overcome drawbacks related to IP network communications; however, they tend to be focussed on voice data and in many cases can cause more problems than they solve. Facsimile users thus tend to have a negative experience when attempting to perform voiceband (non-T.38) facsimile transmissions over packet switched networks.

Translation between circuit switched and packet switched communication networks typically involves the use of translation between different protocols, and is often performed by gateways, sometimes referred to as IP media gateways. A gateway can carry different types of communications between various network types, such as an IP network and a PSTN. Such different types of communications may include voice or facsimile, for example. The gateway typically provides protocol translation service between the networks for these different types of communications. Facsimile transmissions typically adhere to the International Telecommunication Union (ITU) T.30 specification, and are often implemented using the realtime facsimile transmission specification under ITU T.38.

One or more of the nodes in an IP network may not support real time facsimile protocols such as the T.38 protocol or may have interoperation issues with the protocols. In such case(s), the IP network typically relays the realtime facsimile messages using a facsimile pass-through technique that involves other types of protocols and codecs for handling facsimile transmissions originating from PSTN 112. Currently, G.711 (64 kbps) and G.726 (32 kbps) codecs are commonly used facsimile pass-through codecs and are well suited for facsimile transmission due to the low compression levels involved in implementing the codecs. The G.711 codec is often used as a default for pass-through facsimile transmissions, since it is supported in VoIP implementations. The low compression levels of the G.711 codec make it possible for facsimile modem data to be preserved through the compression process with sufficient integrity to permit successful facsimile transmission. The IP network pass-through mode operates similarly to a PSTN-based facsimile transmission once a VoIP G.711 call is established. When the G.711 codec is used to pass a facsimile transmission through the IP network in pass-through mode, the various network nodes, including gateways, generally do not distinguish a facsimile call from a voice call.

When transmitting voice communications, gateways typically support VoIP and can take advantage of voice activity detection (VAD) during voice calls to reduce bandwidth utilization in the IP network. In such a scenario, voice conversation transmissions can readily take advantage of VAD to reduce bandwidth usage that is used to carry voice data, and to avoid carrying communication transmissions that have silence for voice data. This type of silence suppression substitutes "silence" packets for non-speech packets to avoid sending packets that might amplify noise picked up during transmission. Thus, active voice conversations can be carried without also carrying non-speech data, which in turn permits a reduced bandwidth usage for voice conversation type communications to enable communication networks, such as the IP network, to operate more efficiently.

Silence suppression or VAD have the potential to cause corruption of facsimile data if valid facsimile signals become suppressed when they are detected as noise instead of voice communications in facsimile pass-through calls. For example, silence suppression or VAD can contribute to signal clipping, which can negatively impact modem data being transported in the communication network. Accordingly, facsimile pass-through calls are typically provided without engaging the features of silence suppression or VAD.

Packet switched networks can convey facsimile transmissions, such as by providing facsimile over IP (FoIP) service at the various nodes of the network that the facsimile transmission traverses. The nodes of the network may have different data rates for transmissions, due in part to differences in clocking frequency sources. Because of the discrepancy in clocking frequencies among different nodes of the network, certain nodes participating in a facsimile transmission may have an excess or shortage of data packets, such as real-time transport protocol (RTP) packets, during the transmission. The discrepancy in data rates between nodes of the communication network is sometimes referred to as clock skew, and can result in facsimile transmissions becoming distorted, slowed, or dropped when timing specification thresholds are not met due to the effects of clock skew.

FoIP calls may fail because of the lack of clock synchronization, e.g., clock skew, between peer voice gateways or between voice gateways and FoIP endpoints. Voice gateways are typically timed or clocked from local TDM sources, service providers or internal oscillators. FoIP endpoints use a variety of clock sources, which may include operating system timers and various PC hardware clocks. The effect of clock skew can be seen in an excess of RTP packets or as a shortage of RTP packets at a terminating gateway or at an FoIP endpoint. One technique for compensating for clock skew is to provide a common clock source for the digital signal processors (DSPs) in each peer gateway. However, such a technique can be complex and may necessitate the use of additional equipment that can be prohibitively expensive.

In a packet switched network, individual blocks of data are transported with varying propagation delay depending upon the route taken and network conditions at the time, sometimes referred to collectively as "jitter." Jitter can be compensated at a receiving end or midpoint of a network transmission path by providing sufficient overall throughput delay to accommodate the range of propagation delays, often implemented with a jitter buffer in a network component such as an IP media gateway. Individual packets that have been delayed sufficiently to fall outside of a range that can be accommodated by a given jitter buffer are considered lost or dropped. The size of the jitter buffer is an important design consideration in constructing network components or networks in general. For example, a network component that implements a relatively large jitter buffer, with an attendant large overall delay, provides a greater tolerance to jitter and packet delays. However, if the jitter buffer size provides a significant overall delay, the result can be uncomfortably long pauses which can cause both parties to attempt to speak at the same time.

To address these competing objectives, many jitter buffers are adaptive, and dynamically vary their size to minimize the delay according to current network conditions (adaptive jitter buffers). Changing the size of a jitter buffer involves inserting or discarding data, which itself is likely to introduce distortions.

The algorithms used to perform adjustments to a jitter buffer size and/or delay are typically optimized for perceived voice quality. However, modem communications, including facsimile communications, are much less tolerant of the changes that adjustments to jitter buffer size can introduce in overall and round-trip delay, particularly with the use of echo cancelling type modems (e.g., V.34 protocol modems). Modems are also less tolerant of the introduced distortions caused by the step changes in jitter buffer size, which for facsimile transmissions can typically result is some distortion in the received image (or call elongation as image fragments are re-transmitted). Because of these issues that can arise when facsimile transmissions are carried over a packet switched network, many network components are configured to disable adaptive jitter buffers for facsimile and modem communications, and instead are configured to set a fixed jitter buffer size for the duration of such calls.

Facsimile transmissions can tolerate a relatively high overall delay in comparison to voice transmissions. However, when there is significant delay present, particularly when accumulated over multiple devices or network components, facsimile transmissions can fail due to the round trip delay exceeding T.30 timeout values. In addition, failures can occur when the communication delay is greater than that which a typical PSTN facsimile device, such as facsimile device 110, is expected to encounter and handle. Clock skew tends to exacerbate these failures because of the lack of synchronization. The receiver can remove or insert data at various intervals, such as periodically, in an effort to re-synchronize network nodes. As in the case of changing the size of adaptive jitter buffers to accommodate varying line conditions, such action introduces distortion and changes in the overall delay. This condition is true even in solutions that utilize a fixed, large jitter buffer.

When transmitting voice data, a gateway can typically re-synchronize the jitter buffer with other network components during periods of silence. Periods of silence are often available during voice transmissions, since such transmissions tend to be half-duplex in nature, and silence suppression can be used to reduce bandwidth for the call.

When transmitting facsimile data in pass-through mode, a gateway often does not have an opportunity to re-synchronize with other network components during periods of silence. This lack of opportunity to re-synchronize often occurs because facsimile pass-through applications disable silence suppression for the duration of a facsimile call. Moreover, if the jitter buffer of a gateway attempts to compensate for clock skew by removing or creating extra silence zones in the middle of fax image or command data, the facsimile data experiences amplitude or phase shifts that typically either causes the facsimile modem to train down or to drop the facsimile call all together. Training down refers to a reduction in a facsimile transmission rate, where the rate is reduced to a next lower available rate that the endpoint facsimile devices can accept. An FoIP endpoint is not typically constrained by the same real-time timing limitations as voice gateways and may sometimes have greater flexibility than the gateways in handling facsimile communications.

It would be desirable to overcome the drawbacks related to facsimile transmissions in a packet switched network that employs pass-through mode, including the drawbacks associated with fixed-length jitter buffers, clock skew and disabled silence suppression, which can undermined the quality or success of an FoIP transmission.

SUMMARY

The present disclosure provides systems and methods for synchronizing facsimile transmissions between components in a communication network. The synchronization may compensate for variations in transmission rates among the different network components or different paths taken by portions of the facsimile transmission. The synchronization may compensate for clock skew that may occur between network components. The implementation of the compensation to obtain synchronization can be achieved to avoid causing interruptions or distortions in the facsimile transmission data. By applying the compensation at specific points or intervals in a facsimile transmission, synchronization can be achieved to obtain an overall improvement in facsimile transmissions in a packet switched network.

According to an aspect, the present disclosure provides a clock skew compensation for FoIP pass-through calls by permitting an FoIP call participant to detect relative clock skew and implement a synchronization action. An FoIP call participant can be a terminating gateway that provides translation services for facsimile transmissions passing between circuit switched and packet switched communication networks. An FoIP call participant can also be an FoIP endpoint that is connected to a packet switched network. The FoIP call participant can detect the relative clock skew from the inbound IP data stream that originates from a gateway or FoIP end point using various techniques, and can adjust rates of outbound IP data to reduce a magnitude of the clock skew. The adjustment to the outbound IP data rate can synchronize the rate at which facsimile data is produced locally with the rate at which facsimile data is consumed by the remote receiving device. A state of the facsimile call can be used to contribute to adjusting the synchronization by determining appropriate phases of a facsimile call to remove or add silence zones in the outbound IP data stream. The synchronization adjustments made during the appropriate phases of the facsimile call permits a data rate adjustment that avoids negatively impacting modulated facsimile data, while complying with the ITU T.30 timing specifications for facsimile transmission.

According to another aspect, an FoIP node inspects clock skew amounts at different intervals, such as periodically, and realigns or synchronizes the FoIP node outbound data rate to reduce the clock skew amount. The FoIP node realigns or adjusts the outbound data rate by inserting or deleting an RTP frame of data in a phase of the facsimile call related to silence zones. The insertion or deletion of the RTP frame generally avoids violating predefined silence duration thresholds of the ITU T.30 specification. The majority of silence zones available with the ITU T.30 specification can be elongated or shortened by a specific percentage of the duration of a given silence zone. Accordingly, insertion or deletion of an RTP frame representing silence data can occur during certain phases of a facsimile call, such as, for example, during a T.30 facsimile call with half duplex operation.

According to still another aspect, the present disclosure provides an adaptive jitter buffer for use with facsimile transmissions in an IP network component. Network performance can be measured and used to determine an appropriate jitter buffer size or depth. The appropriate jitter buffer size determination can be based on factors that include facsimile transmission status and/or parameters. Changes to the jitter buffer size are scheduled in accordance with available intervals during a facsimile transmission to avoid negatively impacting the facsimile transmission. For example, jitter buffer size changes can be scheduled to coincide with intervals of silence that may occur during the facsimile transmission. By making the jitter buffer size larger or smaller, with inserted or removed silence data, the effective outbound data rate can be controlled to contribute to synchronizing the FoIP participant with a terminating gateway or FoIP endpoint.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Figure 1:
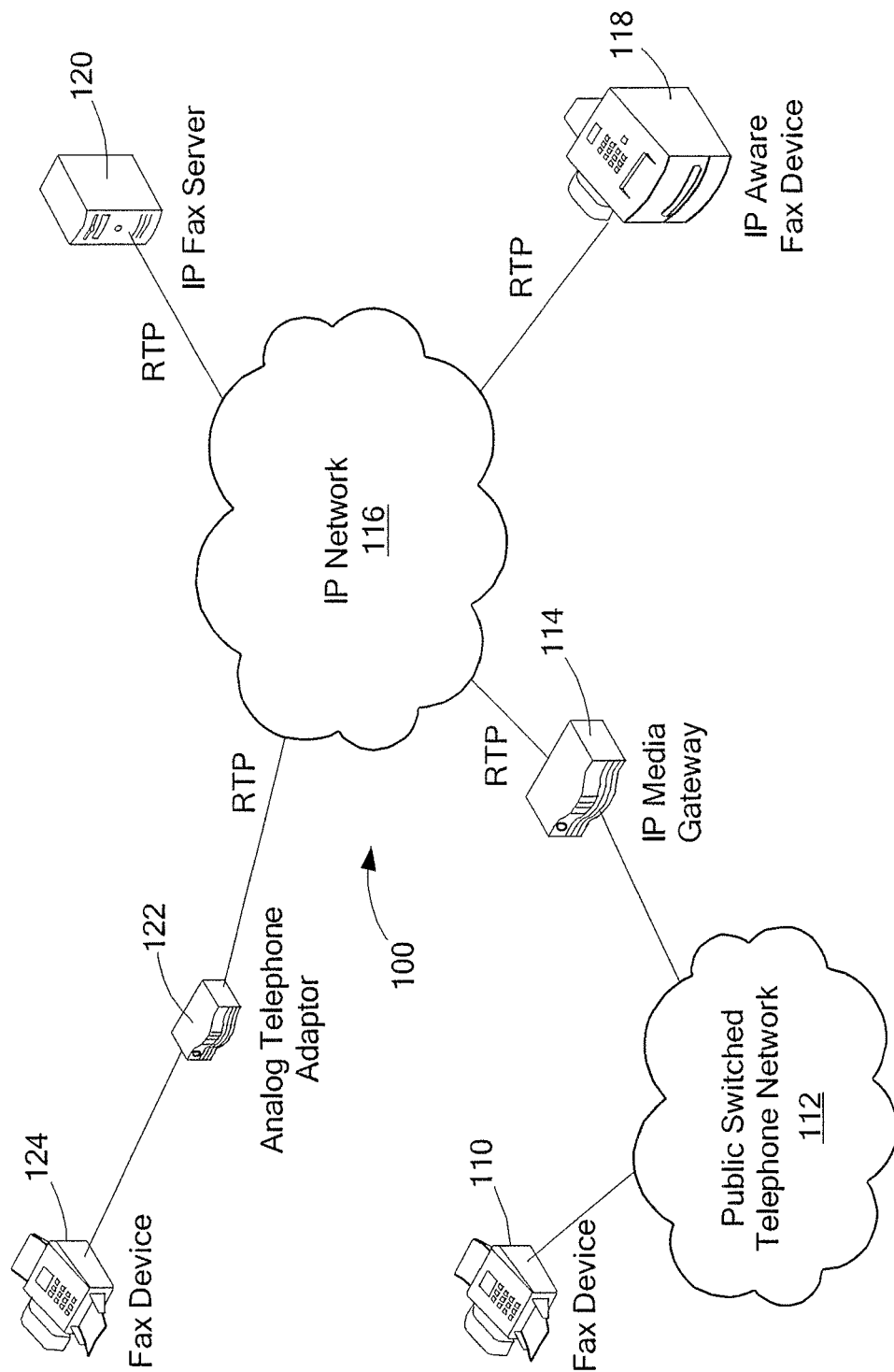
FIG. 1 is a diagram of network components in an exemplary communication network with circuit switched and packet switched components.

Referring to FIG. 1, an exemplary communication network 100 that permits facsimile transmission is illustrated. In network 100, a facsimile device 110 or a facsimile device 124 may originate or receive a facsimile transmission through analog signaling. For example, facsimile device 110 may originate or receive a facsimile transmission that is sent over a Public Switched Telephone Network (PSTN) 112. Facsimile device 110 or 124 may operate using G3 (Group 3) type facsimile transmissions according to facsimile protocols such as the V.17, V.21, V.27 or V.29 facsimile protocols. Facsimile device 110 or 124 may operate using SG3 (Super Group 3) type facsimile transmissions according to the V.34 facsimile protocol. G3 and SG3 type facsimile communications conform to the ITU (International Telecommunication Union) Recommendation T.30 for facsimile transmission in the general switched telephone network, as may be implemented with network 100. PSTN 112 in network 100 may operate with communication protocols for a circuit switched network, such as SS7, T1, E1 and other circuit switched signaling and data communication protocols.

PSTN 112 is connected to an IP Media Gateway 114, which can perform translations between PSTN 112 and protocols used in an IP network 116. IP network 116 is a packet switched network that may implement the Internet Protocol (IP) routing and addressing methodology to transfer data packets. IP network 116 may implement various transport protocols, which may include UDP, TCP, RTP and other media and data communication protocols for packet switched networks. IP network 116 may be implemented to provide facsimile transmission support with facsimile transmission protocols such as the T.38 protocol for real time facsimile transmission. IP network 116 may include a number of network nodes (not shown) through which a facsimile transmission, originating at facsimile device 110, for example, may travel. A facsimile transmission or communication may be composed of facsimile setup or control commands, training data or image data, which may be referred to herein collectively as "facsimile transmissions." The devices connected to IP network 116, such as IP facsimile device 118, IP facsimile server 120, analog telephone adapter 122, which can also serve as an IP Media Gateway, and IP Media Gateway 114 may implement various codecs and/or protocols to provide a variety of communication transmissions.

Figure 2:
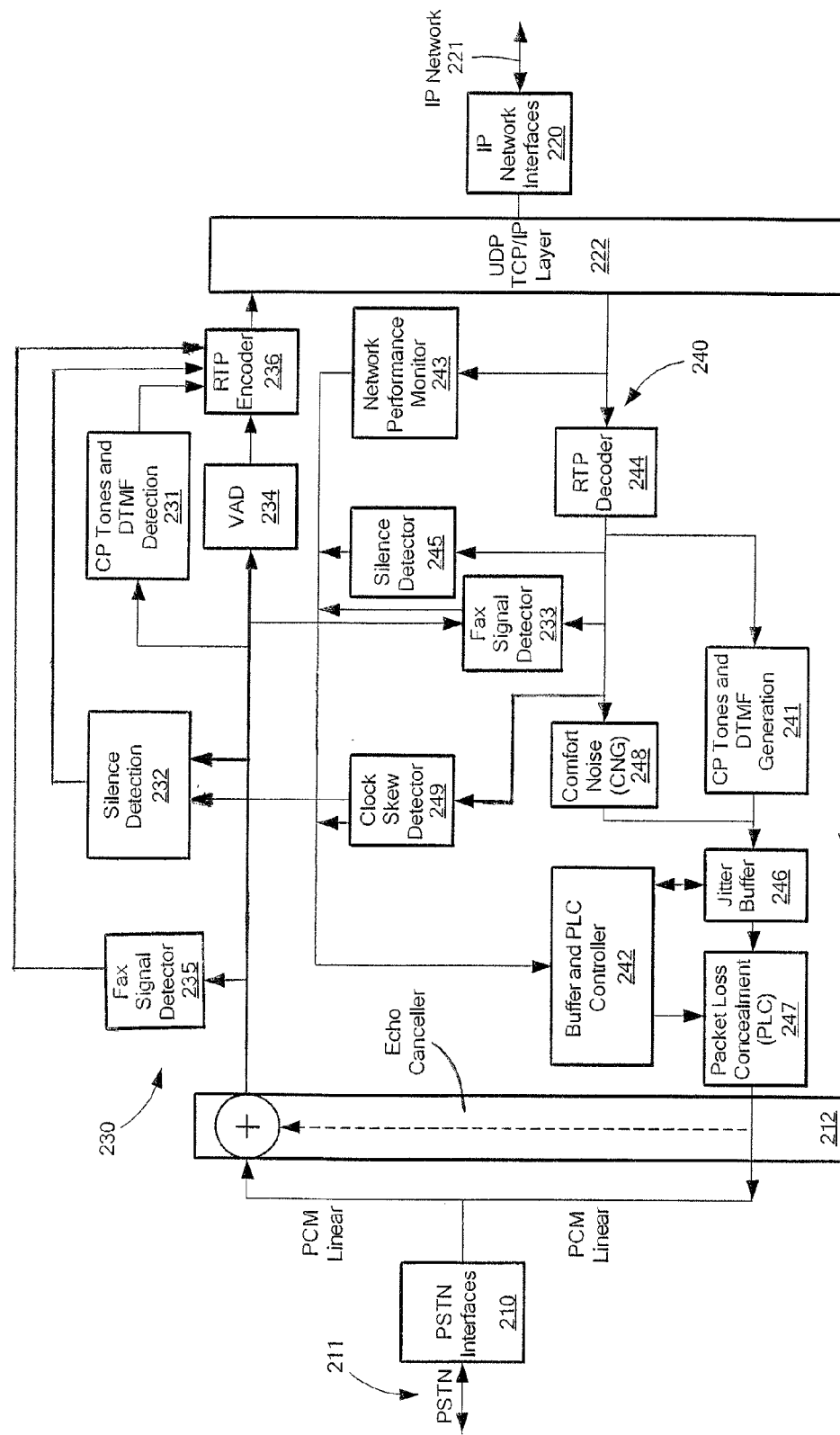
FIG. 2 is a block diagram of an exemplary IP media gateway of the exemplary communication network of FIG. 1.

Referring to FIG. 2, a block diagram of an exemplary IP media gateway 200 is illustrated. IP Media Gateway 200 translates between a circuit switched network, depicted as Public Switched Telephone Network (PSTN) 211, and a packet switched network, such as an IP network 221. IP Media Gateway 200 includes a PSTN interface 210, which provides an interface to PSTN 211, and an IP network interface 220, which provides an interface to IP network 221. Interfaces 210, 220 are bidirectional in that they provide incoming and outgoing pathways for message transmission to and from their respective network. PSTN interface 210 is coupled to an echo canceller 212, which also provides bidirectional message communication between IP Media Gateway 200 and PSTN 211. IP network interface 220 is coupled to a UDP TCP/IP layer 222, which permits bidirectional message communication between IP Media Gateway 200 and IP network 221. Both echo canceller 212 and UDP TCP/IP layer 222 operate on two different pathways through IP Media Gateway 200; one pathway 230 provides a communication route for messages directed from the PSTN 211 to IP network 221, whereas another pathway 240 provides a route for messages directed from IP network 221 to PSTN 211. Pathway 230 includes components to translate PSTN communication network signals to a format that can be used for communication transmissions in IP network 221.

A communication message originating from PSTN 211 passes through PSTN interface 210 and travels through pathway 230, which, as shown in the exemplary embodiment of FIG. 2, includes a VAD element 234 and an RTP encoder 236. In this embodiment, pathway 230 also includes a detection device 231 for detecting call progress (CP) tones and dual tone multi-frequency (DTMF) signaling. A facsimile signal detector 233 is coupled to pathway 230 to detect a facsimile transmission originating from PSTN 211. A silence detection element 232 and a facsimile signal detector 235 are also coupled to pathway 230 for respectively detecting silence and/or facsimile signals in communications travelling from PSTN 211 to IP network 221. Silence detection device 232, facsimile signal detector 235 and detection device 231 provide signals to RTP encoder 236 to contribute to forming a packet stream that is provided to UDP TCP/IP layer 222 for transmission through IP network interface 220 to IP network 221. It is noted that UDP TCP/IP layer 222 can also be a TCP layer.

Pathway 240 provides for communication translation between IP network 221 and PSTN 211. UDP TCP/IP layer 222 provides communication messages to an RTP decoder 244 that decodes the RTP communication messages for translation to pulse code modulation (PCM) format messages. RTP decoder 244 provides an output to facsimile signal detector 233, which can detect facsimile communication transmissions in pathway 240. RTP decoder 244 also provides an output to a tone generation device 241, which can generate CP tones and DTMF signaling tones for use in PSTN 211.

Facsimile signal detector 233 can operate on different signals to detect a facsimile transmission that is sent from PSTN 211 across IP network 221 (facsimile pass-through) or a facsimile transmission transmitted across IP network 221 to be delivered through PSTN 211. Accordingly, facsimile signal detector 233 can detect and indicate when a facsimile transmission is present in respective pathways 230, 240. Facsimile signal detector 233 receives a PCM linear input from echo canceller 212, and so may be responsive to PCM linear input signals to detect a facsimile transmission. Facsimile signal detector 233 also receives an input from RTP decoder 244, and so may be responsive to decoded RTP data to detect a facsimile transmission.

Facsimile signal detector 233 can implement various techniques to detect a facsimile transmission, where such techniques may include, but are not limited to, techniques for examining the content of call setup messages or packets to determine a type of facsimile transmission. For example, facsimile signal detector 233 can determine if a G3 or SG3 type facsimile transmission is occurring, based on an examination of the messages transmitted as part of the facsimile transmission. G3 and SG3 type facsimile transmissions have a digital format that can include parametric information. For example, a G3 type facsimile transmission can include parametric information such as V.21 flags. An SG3 type facsimile transmission can include parametric information such as facsimile CM (Call Menu) signals.

Facsimile signal detector 233 may detect a facsimile transmission based on the parametric information associated with a given transmission, such as the above-mentioned V.21 flags or CM facsimile signals, or based on a given transmission code, protocol, identifier, or other transmission content. Facsimile signal detector 233 can determine and indicate that the communication transmission includes facsimile data, as well as a number of parameters concerning the facsimile transmission. For example, facsimile signal detector 233 can determine the T.30 phase within which the facsimile transmission is presently operating, such as phase B, C or D. Facsimile signal detector 233 can determine and indicate the direction of the facsimile transmission, such as transmitting or receiving, and the modulation method employed, such as, for example, V.17 or V.34. Facsimile signal detector 233 can also determine whether the facsimile mode is ECM or non-ECM, as well as the image compression, such as, for example, MH, MR, MMR, JBIG or JPEG. Each of the parameter values that can be determined by facsimile signal detector 233 can be indicated to controller 242.

A network performance monitor 243 receives packets from UDP TCP/IP layer 222 and monitors network performance by examining network communication characteristics, such as packet delay and/or packet loss, for example. Network performance monitor 243 can indicate the occurrence of significant packet delay or loss in IP network 221, and can adjust the operation of IP Media Gateway 200 to improve communication flow.

Silence detector 245 receives and examines the output of RTP decoder 244 to detect silence data in a facsimile transmission. Silence detector 245 can determine a suitable point in a facsimile transmission for inserting or removing data, for example.

A clock skew detector 249 in accordance with the present disclosure can also receive an output from RTP decoder 244. Clock skew detector 249 can determine and indicate clock skew and estimate the magnitude of the clock skew, in accordance with one or more techniques, as discussed in greater detail below.

IP Media Gateway 200 includes a controller 242 that is directly or communicatively coupled to, and receives the output signals from, each of network performance monitor 243, silence detector 245, facsimile signal detector 233, and clock skew detector 249. Controller 242 also provides control signals to a jitter buffer 246 and a packet loss concealment (PLC) element 247. Jitter buffer 246 provides information (e.g., status and size) to controller 242 to contribute to the control function of controller 242. Jitter buffer 246 can be controlled by controller 242 to have a fixed size, or to be dynamic, such that a size of jitter buffer 246 can be adjusted based on network and traffic conditions. Jitter buffer 246 can be implemented as a variable length FIFO buffer, for example.

During voice communications, IP media gateway 200 may experience packet loss, which can lead to choppy or interrupted audio in a voice conversion carried by IP media gateway 200. PLC element 247 typically operates to replace lost packets or to mask packet loss during voice communications to help smooth the audio to improve a voice conversation experience. PLC element 247 can use various techniques to mask or replace packet loss, such as performing interpolation or other operations to attempt to smooth interruptions in packets during voice communications.

During modem communications, PLC element 247 may replace lost packets with silence packets, since modem communications can typically tolerate a certain level of packet loss or interruption. Interpolation or other smoothing operations to reconstruct packets is not typically employed during modem communications, including facsimile communications, since a facsimile device may incorrectly interpret such reconstructive packets as noise or phase shifts.

In operation, IP Media Gateway 200 detects facsimile transmissions through facsimile signal detector 233 and attempts to ensure that the facsimile transmission is synchronized with one or more other network nodes, such as peer gateways or IP endpoints. In accordance with an exemplary embodiment, synchronization is achieved by inserting or removing silence in an outbound facsimile transmission stream at particular, predetermined instances that can be accommodated within the T.30 specification for facsimile transmissions. According to another exemplary embodiment, synchronization is achieved by inserting or removing silence data using dynamic adjustments to jitter buffer 246. PLC element 247 can also be used to insert or remove silence data to contribute to synchronization. The silence periods can be adjusted to meet thresholds for proper T.30 facsimile transmission operation, while also avoiding interruptions in facsimile data transmission.

In accordance with an exemplary embodiment, facsimile signal detector 233 provides an indication to controller 242 that a facsimile transmission has been detected. Facsimile signal detector 233 also provides information to controller 242 about how dynamic changes can be made to jitter buffer 246 (as determined by controller 242, jitter buffer 246 and network performance monitor 243) without impacting the facsimile transmission data. Controller 242 determines a target size when a change to jitter buffer 246 is indicated. The target size can vary based on various facsimile transmission parameter values, such as transmission phase, direction, modulation method, ECM mode or image compression technique.

As an example, facsimile signal detector 233 can determine and indicate to controller 242 that a facsimile transmission is being transmitted to IP network 221 based on examining the above-mentioned facsimile transmission parameters. In such a case, controller 242 provides signaling to jitter buffer 246 to reduce a size or depth. As another example, facsimile signal detector 233 determines that a facsimile transmission is directed to IP network 221 and is provided in non-ECM mode based on examination of the facsimile status and/or parameter values. In such an instance, jitter buffer 246 can be made larger under the control of controller 242 to accommodate the fewer phase C-D transitions in which changes can be made to the jitter buffer length in attempting to reach the target size.

Jitter buffer 246 can generate a target size for the FIFO buffer, which can be provided to controller 242. Together with current network conditions provided by network performance monitor 243, controller 242 can calculate a new target size and schedule a change to the new target size during appropriate time intervals. For example, controller 242 can schedule changes to the size of jitter buffer 246 during periods of silence in facsimile transmission phase C, when faxes are being transmitted to IP network 221. Alternately, or in addition, controller 242 schedules changes to the size of jitter buffer 246 during the silence transitions between facsimile transmission phase C and D, as well as transitions from phase D to phase C, when facsimile transmissions are being received from IP network 221. Controller 242 can be configured to avoid scheduling a size change for jitter buffer 246 during a facsimile transmission phase C or D when a modem is active.

When a facsimile transmission is received from IP network 221 in non-ECM mode, there are fewer opportunities for changing a size of jitter buffer 246. In the case of facsimile transmissions, a typical full page of fine resolution image facsimile can be accommodated with a typical 100 millisecond jitter buffer size. Providing a jitter buffer size of 100 milliseconds permits the tolerance of a relatively large amount of clock skew without significantly impacting overall round trip delay for facsimile transmissions. The target size of jitter buffer 246 can be reduced during non-ECM mode phase B and phase D, which can result in a reduced overall round trip delay during these phases, when the specification for T.30 facsimile transmissions can have greater sensitivity to round trip delays.

As jitter buffer 246 adjusts to a given target size, PLC element 247 can insert or remove silence data as indicated by controller 242. For example, PLC element 247 can insert or remove silence data when indicated by changes in the target size for jitter buffer 246, or for synchronization operations to reduce clock skew. Controller 242 can operate on a scheduling basis, such that if the goals of size adjustment for jitter buffer 246 or synchronization are not met for the current packet processing, a subsequent silence operation can be scheduled for subsequent packet operations.

In pathway 230 of IP Media Gateway 200, facsimile transmission data is directed from PSTN 211 to IP network 221, while undergoing a suitable translation. For example, PCM data from PSTN interface 210 is translated to RTP packets by RTP encoder 236 for transmission through interface 220 to IP network 221. VAD element 234 detects voice activity, which can be used in VoIP transmissions to suppress silence, but may be disabled for FoIP transmissions. Detection device 231 provides signaling to RTP encoder 236 to encode CP tones DTMF signaling, which may be used in voice or modem transmissions, including facsimile transmissions. Silence detection element 232 receives an input from clock skew detector 249, as well as a PCM input from echo-canceller 212. Silence detection device 232 can determine when periods of silence are available during facsimile transmission based on data arriving from PSTN 211. When clock skew detector 249 indicates a certain amount of clock skew based on inbound data from IP network 221, silence detection device 232 can signal RTP encoder 236 to insert or remove silence frames in the facsimile transmission data stream provided by RTP encoder 236. With the insertion or removal of silence frames in the data stream provided by RTP encoder 236, the effective outbound packet rate of IP Media Gateway 200 can be modified to improve synchronization with a terminating gateway (not shown) or an FoIP endpoint (not shown) connected to IP network 221.

Clock skew detector 249 can detect clock skew in accordance with one or more of various techniques or algorithms. The selection of a particular technique or algorithm may depend upon a desired accuracy and/or sensitivity to jitter. One exemplary approach to detect clock skew is to determine average delay divergence. This approach calls for continually monitoring the average network transit delay and comparing it with an active delay estimate. Increasing divergence between the active delay estimate and measured average delay denotes the presence of clock skew. As each packet arrives, clock skew detector 249 calculates the instantaneous one-way delay for the nth packet, $d_n$ based on the reception time and in RTP timestamp of the packet:

$$d_n = T_{L(n)} - T_{R(N)}$$

On receipt of the first packet, clock skew detector 249 sets the active delay, $E=d_0$, and the estimated average delay, $D_0=d_0$. With each subsequent packet, the average delay estimate, $D_n$ is updated by an exponentially weighted moving average:

$$D_n = \frac{31}{32}D_{n-1} + \left(1 - \frac{31}{32}\right)d_n$$
$$= (31D_{n-1} + d_n)/32$$

The factor $31/32$ controls the averaging process, with values closer to unity (1) making the average less sensitive to short-term fluctuation in the transit time. This calculation is similar to the calculation of the estimated jitter; but it retains the sign of the variation, while using the factor $31/32$ as a time constant that is chosen to capture the long-term variation and reduce the response to short-term jitter.

The average one-way delay, $D_n$, is compared with the active delay estimate, E, to estimate the divergence since the last estimate:

$$\text{divergence}=E-D_n$$

If the remote clock and the local clock are synchronized, the divergence will be close to zero, with only minor variations due to network jitter. If the clocks are skewed, the divergence will increase or decrease until it exceeds a predetermined threshold, which can be used to cause IP media gateway 200 to take compensating action. The threshold can be dependent on many factors related to network conditions and communications. In accordance with an exemplary embodiment, the threshold is set to an outbound RTP frame duration, which is typically in a range of from about 10 ms to about 20 ms for most VoIP and FoIP applications. After the threshold is reached, IP media gateway 200 can reset the active delay estimate, E, to equal the current delay estimate, $D_n$, resetting the divergence to zero in the process.

IP Media Gateway 200 can implement a number of algorithms to achieve various methods of the present disclosure. In some exemplary methods that are presently disclosed, some components of IP Media Gateway 200 may be omitted or bypassed. Some of the disclosed methods may combine or selectively use different techniques, such that IP Media Gateway 200 represents a generalized exemplary embodiment that can be used to implement one or more of the disclosed methods.

Figure 3:
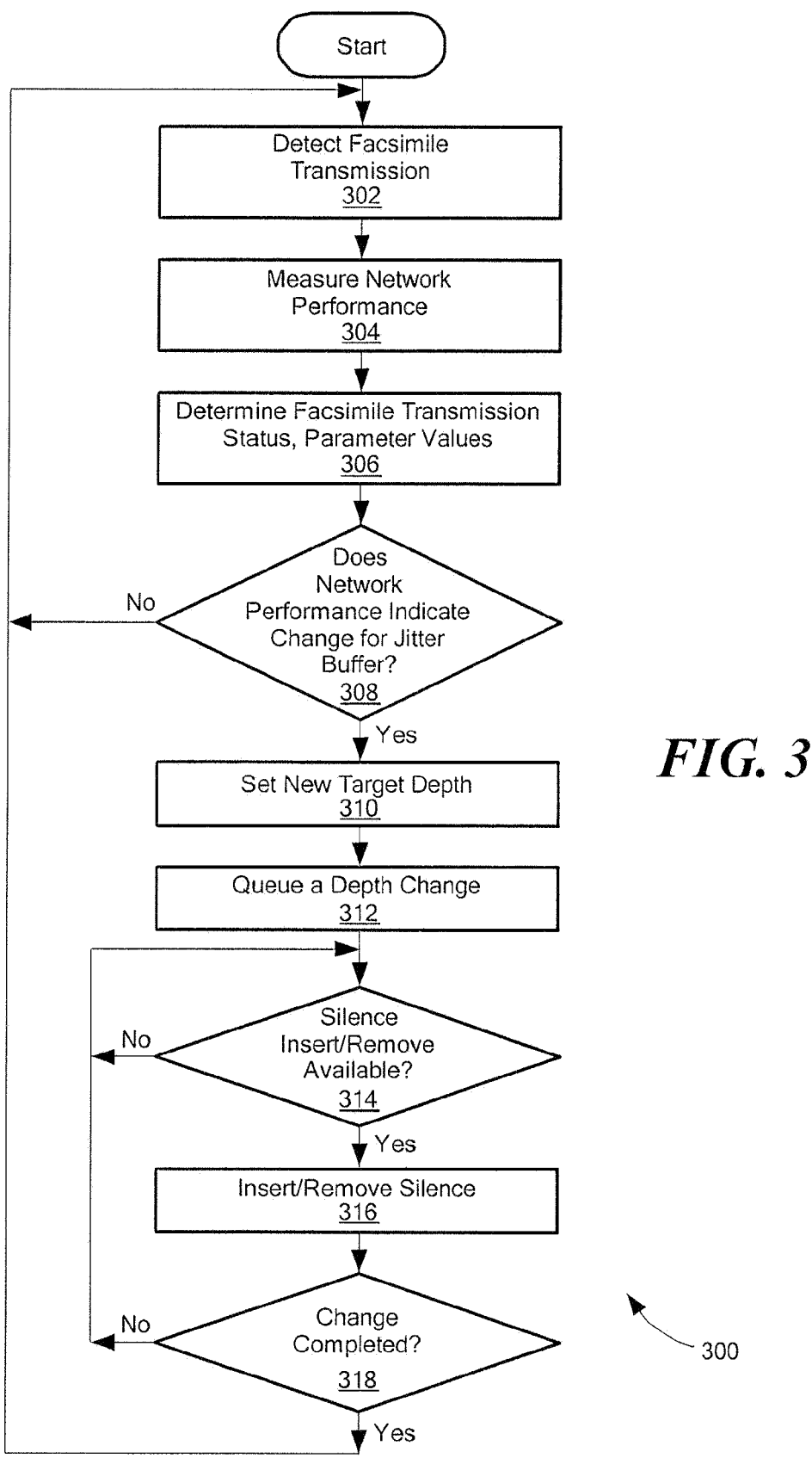
FIGS. 3-6 are flowcharts illustrating exemplary synchronization algorithms in accordance with the present disclosure.

Referring now to FIG. 3, an exemplary embodiment of the present disclosure is illustrated with flowchart 300, which describes a process for synchronizing facsimile transmission data processed by IP Media Gateway 200 (FIG. 2) in pass-through mode. A block 302 indicates the detection of a facsimile transmission in IP Media Gateway 200, such as may be achieved with facsimile signal detector 233. A block 304 indicates the measurement of network performance, as may be achieved using network performance monitor 243. A block 306 indicates the determination of facsimile transmission status and/or parameter values, which can be achieved using facsimile signal detector 233. The facsimile transmission status and parameter values indicated in block 306 may include detection of a phase or phase transition in a T.30 facsimile transmission, such as, for example, detection of one or more of a phase A, B, C or D, or transitions between these phases. Parameter values may include those discussed above, for example, facsimile direction, modulation method, ECM mode or image compression.

A decision block 308 illustrates a determination of whether the network performance indicates a change to the jitter buffer, such as jitter buffer 246. For example, the network performance might be indicated as having a sufficiently large amount of packet delay or packet loss to indicate a change being desired for the jitter buffer length. If there is no indication of a jitter buffer change, decision block 308 illustrates processing returning to block 302 to continue evaluating synchronization. If the network performance indicates a jitter buffer change, as illustrated in decision block 308, process 300 proceeds to a block 310, which indicates the operation of setting a new target depth for jitter buffer 246. Process 300 continues to a block 312, which indicates that the target depth change for jitter buffer 246 is scheduled or queued, for example in a command queue, to implement the depth change. According to an exemplary embodiment, jitter buffer depth control can be state machine driven, so that scheduling a depth change can indicate one or more desirable states for making the depth change. Jitter buffer depth changes can be achieved by inserting or removing packets in the jitter buffer, effectively increasing or decreasing an overall throughput delay.

Process 300 continues to decision block 314, which illustrates a determination of whether an opportunity to insert or remove silence is available, based on a depth change to the jitter buffer 246 and the facsimile transmission status and/or parameter values. If an opportunity to insert or remove silence is not available, decision block 314 indicates that the "No" branch is taken to the input of decision block 314, which illustrates the continued checking for an opportunity to insert or remove silence. If an opportunity to insert or remove silence is available based on the depth change to jitter buffer 246 and the facsimile transmission status and/or parameter values, decision block 314 indicates the continuation of processing through the "Yes" branch. The "Yes" branch of decision block 314 indicates continued processing to insert or remove silence as shown in a block 316. The insertion or removal of silence illustrated in block 316 is implemented in conjunction with a change in the size of the depth of jitter buffer 246, and occurs at an appropriate, available time in accordance with intervals of silence as determined by the facsimile transmission status and/or parameter values. The intervals of silence that are available for the insertion or removal of silence as shown in block 316 are provided in Table 1 below.

TABLE 1

Silence insertion/removal for facsimile transmission at an FoIP node

| | Transmitting | Receiving |
|---|---|---|
| Underrun: Insert Silence During: | Phase B, while remote end is generating V.21 commands | Phase B, while remote end is generating V.21 commands or TCF |
| | Silence between phases C and D (C->D or D->C transitions). Insert 75 ms +/− 20ms, or two 10ms or one 20 ms frames. | Phase C, while remote end is transmitting image data |
| | Phase D, while remote end is generating V.21 commands | Phase D, while remote end is generating V.21 commands following phase C |
| | SG3, during half-duplex operation and phase C when remote end is transmitting image data | None |
| Overrun: Remove Silence During: | Phase B, while remote end is generating V.21 commands | Phase B, while remote end is generating V.21 commands or TCF |
| | Silence between phases C and D (C->D or D->C transitions). Insert 75 ms +/− 20 ms, or two 10 ms or one 20 ms frames. | Phase C, while remote end is transmitting image data |
| | Phase D, while remote end is generating V.21 commands | Phase D, while remote end is generating V.21 commands following phase C |
| | SG3, during half-duplex operation and phase C when remote end is transmitting image data | None |

Once silence has been inserted or removed as shown in block 316, process 300 continues with a decision block 318, which indicates the determination of whether the change to the jitter buffer depth has been completed. If the change to the jitter buffer depth has not been completed, processing transfers to the input of decision block 314 through the No branch of decision block 318 to continue to look for opportunities to insert or remove silence. If the change to the jitter buffer depth has been completed, decision block 318 illustrates transfer to the beginning of process 300 through the Yes branch, where a facsimile transmission can be detected, as illustrated in block 302.

Figure 4:
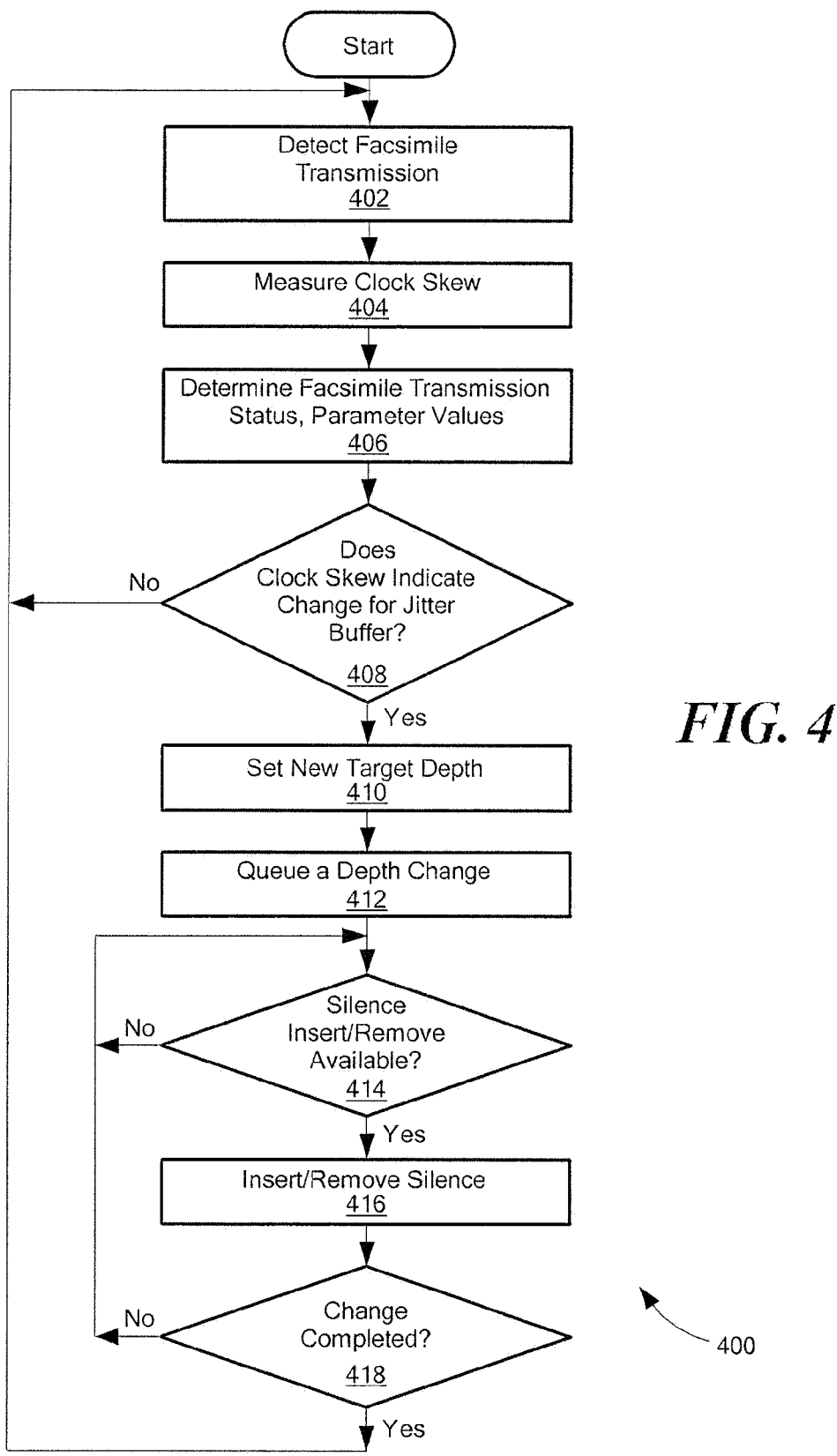

Referring now to FIG. 4, an exemplary embodiment of the present disclosure is illustrated with flowchart 400, which describes a process for synchronizing facsimile transmission data processed by IP Media Gateway 200 (FIG. 2) in pass-through mode. According to the exemplary embodiment illustrated in FIG. 4, flowchart 400 can be applicable to pathway 240 (FIG. 2) where data flows from IP Network 221 to PSTN 211. In flowchart 400, a block 402 indicates the detection of a facsimile transmission in IP Media Gateway 200, such as may be achieved with facsimile signal detector 233. A block 404 indicates the measurement of clock skew, as may be achieved using clock skew detector 249. A block 406 indicates the determination of facsimile transmission status and/or parameter values, which can be achieved using facsimile signal detector 233. The facsimile transmission status and parameter values indicated in block 406 may include detection of a phase or phase transition in a T.30 facsimile transmission, such as, for example, detection of one or more of a phase A, B, C or D, or transitions between these phases. Parameter values may include those discussed above, for example, facsimile direction, modulation method, ECM mode or image compression.

A decision bock 408 indicates a determination of whether the measured clock skew indicates a change to the jitter buffer, such as jitter buffer 246. For example, the measured clock skew may indicate a divergence in synchronization, which would indicate a change being desired for the jitter buffer length. If there is no indication of a jitter buffer change, decision block 408 illustrates that processing continues through the "No" branch to block 402 to continue evaluating synchronization. If the measured clock skew indicates a jitter buffer change, as illustrated in decision block 408, process 400 proceeds to a block 410, which indicates the operation of setting a new target depth for jitter buffer 246. The process 400 continues to a block 412, which indicates that the target depth change for jitter buffer 246 is scheduled or queued, for example in a command queue, to implement the depth change. Process 400 continues to decision block 414, which illustrates a determination of whether an opportunity to insert or remove silence is available, based on a depth change to the jitter buffer 246 and the facsimile transmission status and/or parameter values. If an opportunity to insert or remove silence is not available, decision block 414 indicates the "No" branch being taken to the input of decision block 414, which illustrates the continued checking for an opportunity to insert or remove silence. If an opportunity to insert or remove silence is available based on the depth change to jitter buffer 246 and the facsimile transmission status and/or parameter values, decision block 414 indicates the continuation of processing through the "Yes" branch. The "Yes" branch of decision block 414 indicates continued processing to insert or remove silence as shown in a block 416. The insertion or removal of silence illustrated in block 416 is implemented in conjunction with a change in the size of the depth of jitter buffer 246, and occurs at an appropriate, available time in accordance with intervals of silence as determined by the facsimile transmission status and/or parameter values. The intervals of silence that are available for the insertion or removal of silence as shown in block 416 are provided in Table 1 above.

Once silence has been inserted or removed as shown in block 416, process 400 continues with a decision block 418, which indicates the determination of whether the change to the jitter buffer depth has been completed. If the change to the jitter buffer depth has not been completed, processing transfers to the input of decision block 414 through the No branch of decision block 418 to continue to look for opportunities to insert or remove silence. If the change to the jitter buffer depth has been completed, decision block 418 illustrates transfer to the beginning of process 400 through the Yes branch, where a facsimile transmission can be detected, as illustrated in block 402.

Figure 5:
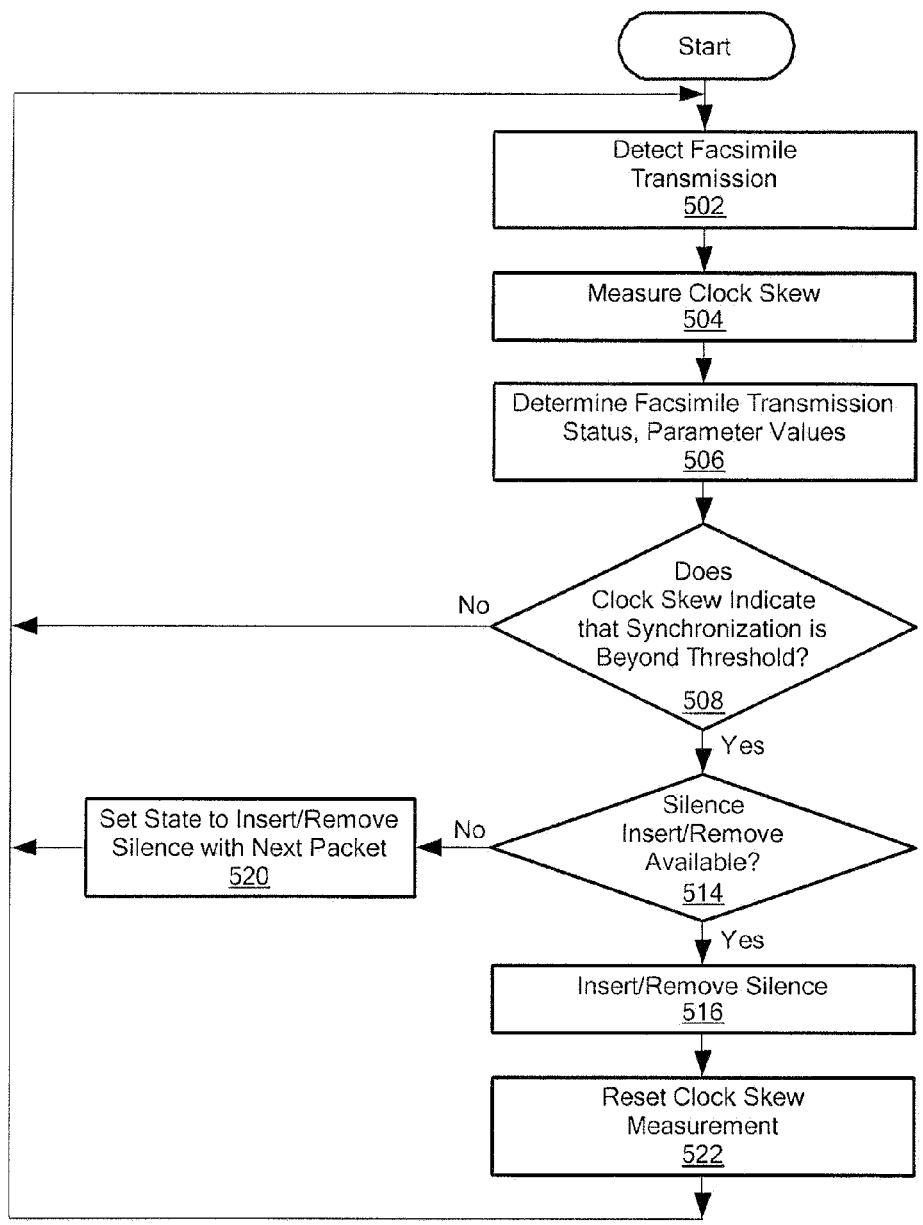

Referring now to FIG. 5, an exemplary embodiment of the present disclosure is illustrated with flowchart 500, which describes a process for synchronizing facsimile transmission data processed by IP Media Gateway 200 (FIG. 2) in pass-through mode. According to the exemplary embodiment illustrated in FIG. 5, flowchart 500 can be applicable to pathway 230 (FIG. 2) where data flows from PSTN 211 to IP Network 221. In flowchart 500, a block 502 indicates the detection of a facsimile transmission in IP Media Gateway 200, such as may be achieved with facsimile signal detector 233. A block 504 indicates the measurement of clock skew, as may be achieved using clock skew detector 249. A block 506 indicates the determination of facsimile transmission status and/or parameter values, which can be achieved using facsimile signal detector 233. The facsimile transmission status and parameter values indicated in block 506 may include detection of a phase or phase transition in a T.30 facsimile transmission, such as, for example, detection of one or more of a phase A, B, C or D, or transitions between these phases. Parameter values may include those discussed above, for example, facsimile direction, modulation method, ECM mode or image compression.

A decision bock 508 indicates a determination of whether the measured clock skew is beyond a given threshold to indicate that IP Media Gateway 200 should be resynchronized with a terminating gateway or FoIP endpoint connected to IP network 221. If a certain amount of clock skew is detected, such as, for example, 10 milliseconds, resynchronization is indicated. If the measured clock skew is not beyond a given threshold as indicated in decision block 508, process 500 returns to the start to continue evaluating synchronization. If the measured clock skew is beyond the given threshold in decision block 508, synchronization is indicated, and decision block 508 indicates that the "Yes" branch is taken to a decision block 514. Decision block 514 illustrates a determination of whether an opportunity to insert or remove silence is available, based on the facsimile transmission status and/or parameter values. If an opportunity to insert or remove silence is not available, decision block 514 indicates that the "No" branch is taken to a block 520, which illustrates the setting of a state or flag to insert or remove silence if the opportunity becomes available with the transmission of the next RTP packet. If an opportunity to insert or remove silence is available based on the facsimile transmission status and/or parameter values, decision block 514 indicates the continuation of processing through the "Yes" branch, which indicates continued processing to insert or remove silence as shown in a block 516. The insertion or removal of silence illustrated in block 516 is implemented in conjunction with the transmission of an RTP packet, such as may be done with RTP encoder 236, and occurs at an appropriate, available time in accordance with intervals of silence as determined by the facsimile transmission status and/or parameter values. The intervals of silence that are available for the insertion or removal of silence as shown in block 516 are provided in Table 1 above.

Once silence has been inserted or removed as shown in block 516, process 500 continues with a block 522, which indicates the resetting of the clock skew measurement. Processing then returns to the input of block 504, to continue to evaluate clock skew and synchronization.

Figure 6:
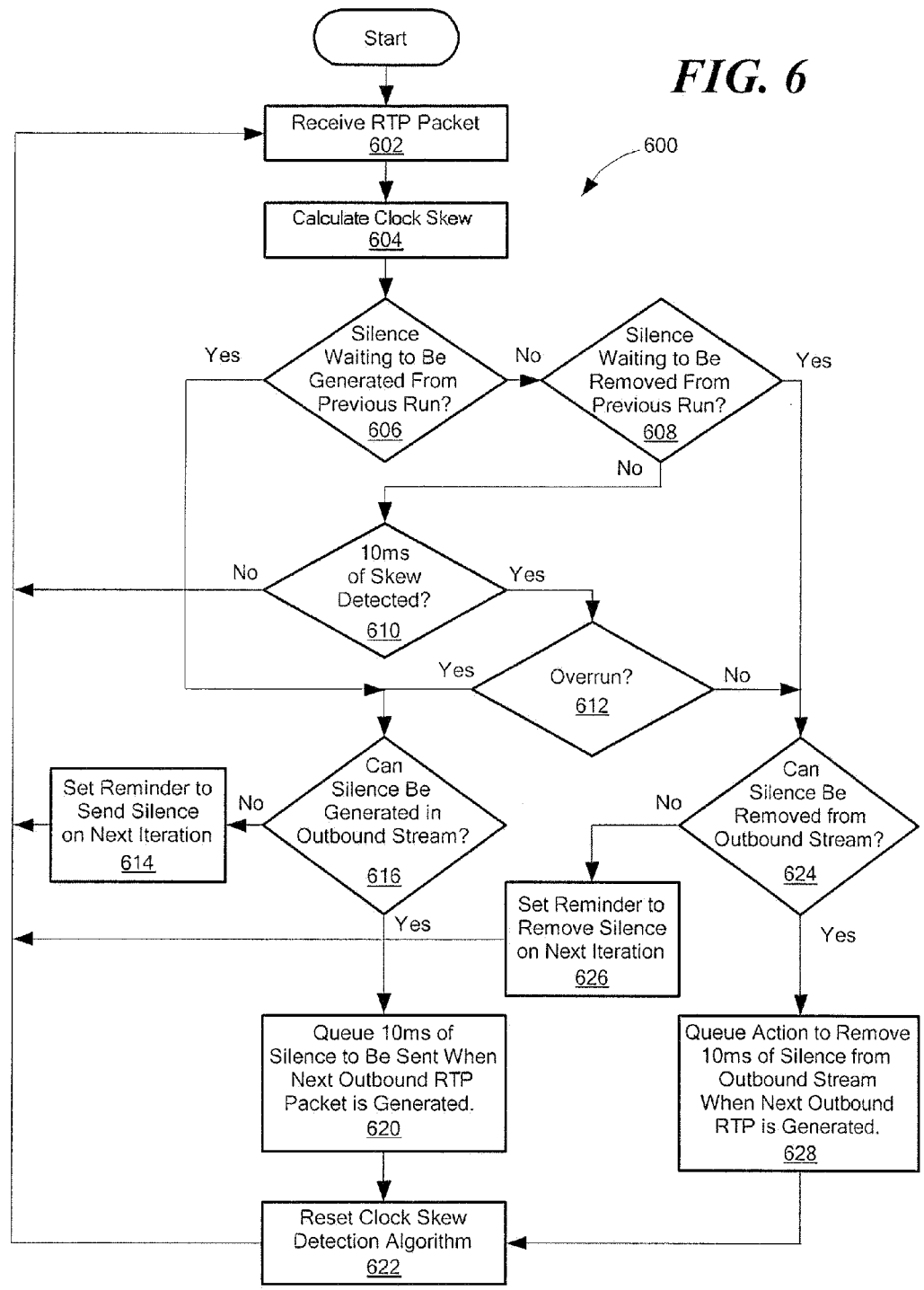

Referring now to FIG. 6, a flowchart process 600 for synchronizing FoIP transmissions is illustrated. Process 600 begins with the receipt of an RTP packet, as illustrated in a block 602. A block 604 illustrates the calculation of clock skew based on the receipt of the RTP packet indicated in block 602. The technique for calculating clock skew, as called for by block 604, can be one or more of those discussed above, including the techniques that can be implemented by clock skew detector 249, for example. Process 600 continues to a decision block 606, which indicates a determination of whether silence was generated from a previous handling of an RTP packet. If silence was queued to be generated in a previous iteration of process 600, decision block 606 indicates a transfer to decision block 616. Decision block 616 illustrates a determination of whether silence can be generated in an outbound facsimile data stream. If silence cannot be generated in the outbound data stream, decision block 616 indicates a "No" branch being taken to a block 614. Block 614 indicates the provision of a flag or setting to generate and/or send silence in the outbound data stream on the next iteration of process 600, and the return of processing to block 602. If the determination illustrated in decision block 616 finds that silence can be generated in an outbound data stream, processing continues on the "Yes" branch of decision block 616 to a block 620. Block 620 indicates an operation of queuing 10 milliseconds of silence, as a packet that is to be sent when the next outbound RTP packet is generated, such as may be done by RTP encoder 236. Block 620 indicates that processing then flows to a block 622, which indicates a reset to the clock skew detection algorithm. Accordingly, once silence is queued to be sent when an outbound RTP packet is to be generated, as indicated in block 620, the clock skew detection algorithm can be reset to continue to evaluate synchronization in FoIP pathways. The clock skew detection algorithm can be reset to an initial value, or can be reset to another value that accounts for accumulated clock skew and/or silence being sent in the outbound data stream.

When the determination illustrated in decision block 606 indicates that there is no silence waiting to be generated from a previous iteration, process 600 indicates that processing flows to a decision block 608 through the No branch of decision block 606. Decision block 608 indicates a determination as to whether silence is waiting to be removed, as determined in a previous iteration of process 600 and in which case decision block 608 indicates a transfer of processing to a decision block 624 along the Yes branch of decision block 608. Decision block 624 indicates the determination of whether silence can be removed from an outbound data stream. If silence removal from the outbound data stream is unavailable, decision block 624 indicates a transfer of processing to a block 626 along the No branch of decision block 624. Block 626 indicates the provision of a flag or setting to remove silence in a subsequent iteration of process 600, and indicates transfer of processing to block 602 to begin a new iteration. If silence can be removed from the outbound data stream, as indicated in decision block 624, processing proceeds along the Yes branch of decision block 624 to a block 628. Block 628 indicates the operation of queuing the removal of 10 milliseconds of silence from the outbound data stream when the next outbound RTP packet is generated from the FoIP node, such as may be achieved with RPT encoder 236. From block 628, processing is indicated as being transferred to block 622, where the clock skew detection algorithm is indicated as being reset, and processing is indicated as being transferred to block 602 to begin a new iteration.

The preceding description of the systems and methods of the present disclosure are primarily directed to a gateway, such as IP Media Gateway 200 (FIG. 2) as an FoIP node in a packet-switched network. The systems and methods of the present disclosure may also be implemented in an FoIP endpoint, such as an IP aware facsimile device.

Figure 7:
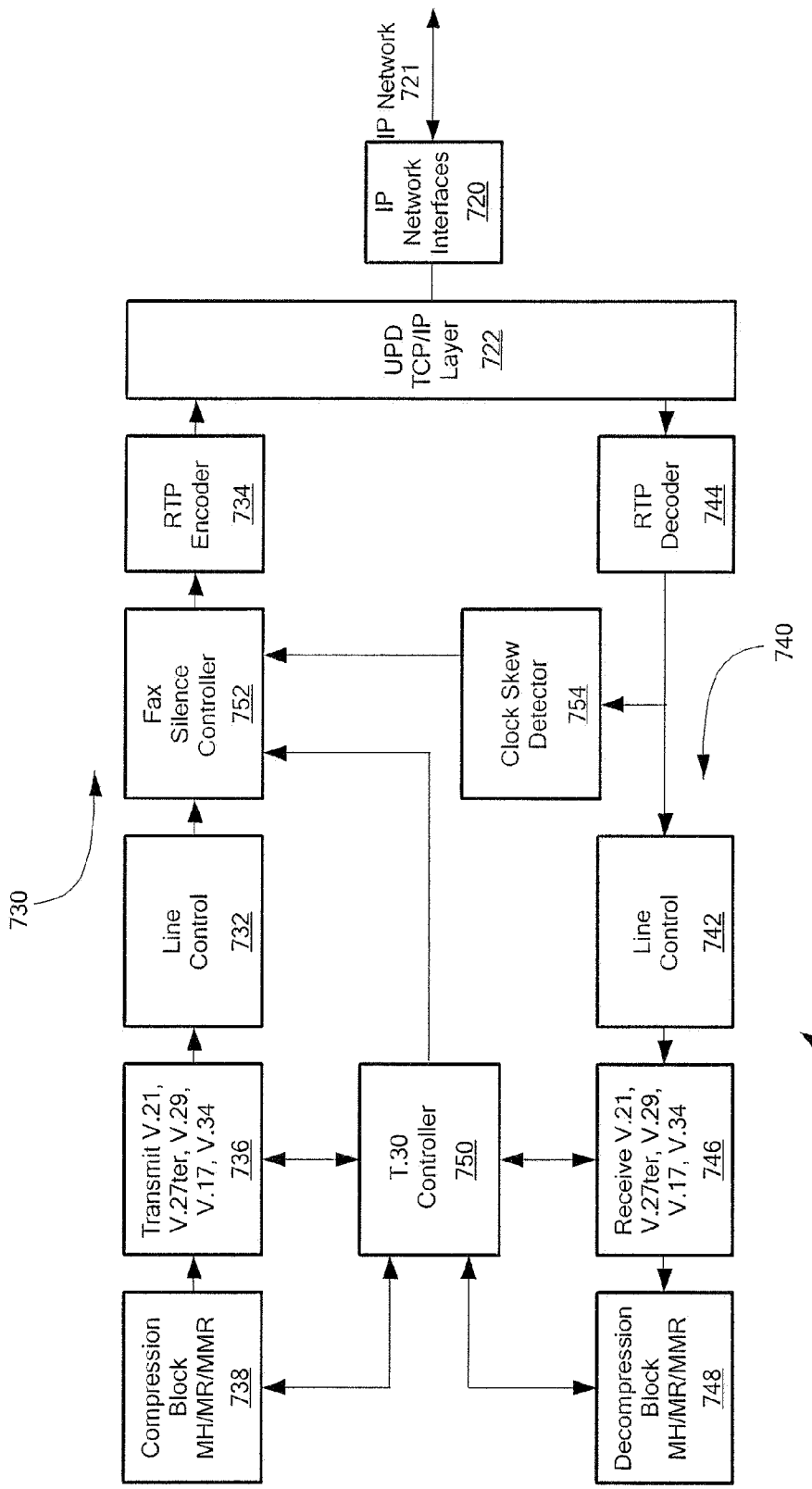
FIG. 7 is a block diagram of an exemplary IP endpoint facsimile device.

Referring now to FIG. 7, a block diagram of an IP endpoint 700 for sending and receiving facsimile transmissions in accordance with an exemplary embodiment of the disclosed systems and methods is illustrated. IP endpoint 700 (e.g., a facsimile IP endpoint) is connected to a packet switched network, such as IP network 721. IP endpoint 700 has an IP interface 720 that is bidirectional for sending and receiving messages between IP endpoint 700 and IP network 721. IP network interface 720 is coupled to a UDP TCP/IP layer 722, which permits two-way message communication between IP endpoint 700 and IP Network 721. In particular, layer 722 receives outgoing facsimile messages through pathway 730, and provides incoming messages to pathway 740. Pathways 730, 740 implement sending and receiving constructs for facsimile transmissions and messages to realize an IP aware facsimile device.

An RTP decoder 744 in pathway 740 decodes facsimile transmissions, the content of which is passed to a line control 742, which handles line signaling to implement the various facsimile or modem protocols. Received facsimile transmissions are further transferred to a protocol receiver 746, which can extract facsimile data from the facsimile transmission packets according to the various facsimile modem standards, such as the V.17, V.21, V.27, V.29 or V.34 protocols. Protocol receiver 746 exchanges control messages with IP endpoint controller 750, which implements the T.30 control for a facsimile call or session. Protocol receiver 746 also transfers extracted facsimile data to a decompression mechanism 748, where the received facsimile data is decompressed from its compressed transmission state to recover the originally transmitted facsimile data. Decompression mechanism 748 also exchanges control messages with T.30 controller 750.

Outgoing facsimile transmissions from IP endpoint 700 are provided through pathway 730, beginning with a compression mechanism 738. Compression mechanism 738 takes facsimile data as input and compresses the data to permit more efficient facsimile transmission operations. The compressed facsimile data is provided to a protocol transmitter 736, where the modem protocol in use is applied to produce facsimile transmission data in accordance with the desired modem protocol, e.g., V.17, V.21, V.27, V.29 or V.34 modem protocols. Compression mechanism 738 and protocol transmitter 736 exchange control information with T.30 controller 750 to arrange the outgoing facsimile data transmission. The facsimile transmission data is applied to a line control 732, which determines line operation for facsimile data transmission. Line control 732 provides an output to a facsimile silence controller 752, which determines periods of silence in the facsimile transmission. Facsimile silence controller 752 provides an output to an RTP encoder 734, which generates packets to layer 722 for transport over IP network 721. Layer 722 provides the transport mechanism for packetized data to be transmitted over IP network 721 through IP network interface 720.

Facsimile silence controller 752 determines when silence is to be transmitted, or when IP endpoint 700 is in an idle transmission state. Sometimes, IP endpoint 700 transmits silence when in an idle state, as determined, for example, by facsimile silence controller 752, which can modify the signals provided by line control 732 to control transmission of silence from IP endpoint 700. Facsimile silence controller 752 provides the silence-controlled facsimile transmission data to RTP encoder 734 for transmission over IP network 721.

IP endpoint 700 also includes a clock skew detector 754 that receives an input from RTP decoder 744. Clock skew detector 754 can evaluate the output of RTP decoder 744 to measure clock skew in accordance with one or more of the techniques discussed above, such as the average delay divergence, for example. Clock skew detector 754 provides output signaling to facsimile silence controller 752 to indicate when the clock skew measurement goes beyond a given threshold, or meets some other criteria indicating a lack of synchronization with a terminating gateway (not shown) or FoIP endpoint (not shown) that is connected to IP network 721. Facsimile silence controller 752 can cause silence packets to be inserted or removed from the facsimile transmission data stream provided to RTP encoder 734 on the basis of the output signaling provided by clock skew detector 754. The inserted or removed silence data is provided in accordance with a status of the facsimile transmission and/or parameter values associated with the facsimile transmission. Thus, facsimile silence controller 752 inserts or removes silence data when a certain amount of clock skew is detected by clock skew detector 754, as opportunities become available for silence insertion or removal in the facsimile data stream provided to RTP encoder 734. The inserted or removed silence data modifies the effective packet rate provided by RTP encoder 734 as transmitted to IP network 721 to contribute to synchronizing IP endpoint 700 with a terminating FoIP node.

The operation of IP endpoint 700, in accordance with the systems and methods of the present disclosure, is described in process 600 shown in FIG. 6. Process 600 includes decision blocks 616 and 624, which respectively indicate determinations being made as to whether silence can be generated or removed in an outbound facsimile data stream. These determinations are made in IP endpoint 700 based on an inherent knowledge of the facsimile status and parameter values. For example, controller 750 in IP endpoint 700 provides control signaling to facsimile silence controller 752 to indicate the facsimile transmission status and/or facsimile transmission parameter values to permit facsimile silence controller 752 to determine when silence can be inserted into or removed from the outbound facsimile data stream. The determinations for when opportunities are available for inserting or removing silence are given in Table 1 above.

Facsimile transmissions provided in accordance with the V.34 modem protocol can support the detection and insertion of flags that can be used to make some or all of the determinations discussed above. For example, a flag can be inserted in a facsimile transmission to indicate timing for packet transit. Flags may be used, for example, to indicate when a period of silence may be encountered, such as when a transition between phases is about to occur. Flags may also be used to indicate control scenarios, such as by indicating which of a pair of FoIP endpoints will conduct the synchronization operations. The flags, in general, can improve the responsiveness of the systems and methods of the present disclosure by providing additional opportunities for changing a jitter buffer size or resynchronizing an FoIP participant node. In addition, an FoIP endpoint can measure T.30 timing to determine end-to-end command response times for use as input for the calculation of a target jitter buffer depth. An FoIP endpoint can also implement the systems and methods of the present disclosure to compensate for clock skew by tuning its reference clock to that of the opposite terminating gateway or FoIP endpoint. Alternately, or in addition, the FoIP endpoint can modify an outbound data rate to send packets at a faster or slower rate based on a magnitude of the measured clock skew. In general, FoIP endpoints can be flexible in implementing a synchronization scheme, since the real-time timing constraints that are imposed on terminating gateways by PSTN trunks do not generally apply to FoIP endpoints.

The operations herein depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A facsimile transmission processing device that includes a packet switched network interface for connection to a packet switched network, comprising:
    a packet handler communicatively coupled to the packet switched network interface and being operative to send a facsimile transmission packet to the packet switched network or to receive a facsimile transmission packet from the packet switched network; and
    a controller communicatively coupled to the packet handler and being operative to control the packet handler to modify a rate of a packet stream that contains facsimile related packets in response to a content of a facsimile transmission represented by the packet stream that contains the facsimile related packets.

2. The device according to claim 1, wherein the content of the facsimile transmission relates to a status of a facsimile call implemented by the facsimile transmission.

3. The device according to claim 1, wherein the packet stream is one or more of an inbound packet stream or an outbound packet stream.

4. The device according to claim 1, further comprising:
a facsimile detector coupled to the packet switched network interface for detecting the content of the facsimile transmission.

5. The device according to claim 4, wherein the facsimile detector is operative to detect one or more of a facsimile transmission, a facsimile transmission phase, a facsimile transmission direction, a modulation method, an error correction mode or an image compression method.

6. The device according to claim 1, wherein the packet handler is operative to insert or remove a packet in the packet stream.

7. The device according to claim 6, wherein the packet handler comprises an adaptive jitter buffer with a variable depth that is operative to modify an overall throughput delay of the facsimile transmission processing device.

8. The device according to claim 7, wherein the controller is operative to modify the jitter buffer depth based on a network performance parameter.

9. The device according to claim 8, wherein the controller is operative to modify the jitter buffer depth based on an availability for modification as indicated by one or more of a facsimile status or parameter value.

10. The device according to claim 7, wherein the controller is operative to modify the jitter buffer depth based on one or more of a facsimile status or parameter value.

11. The device according to claim 10, wherein the controller is responsive to a status of phase C or phase D of the facsimile transmission during an interval of silence to modify the jitter buffer.

12. The device according to claim 6, further comprising:
a clock skew detector communicatively coupled to the packet switched network interface and to the controller for determining a relative packet rate between the packet switched network interface and another facsimile transmission processing device in the packet switched network that is operative to send or receive facsimile related packets in the packet stream.

13. The device according to claim 12, wherein the controller is responsive to the clock skew detector to control the packet handler to insert or delete one or more facsimile related packets in the packet stream.

14. The device according to claim 13, wherein the controller is operative to control the packet handler to insert or delete the one or more facsimile related packets based on one or more of a facsimile call status or parameter value.

15. The device according to claim 14, wherein the controller is responsive to a status of phase B, phase C or phase D of the facsimile transmission in which an interval occurs that permits the packet handler to insert or delete the one or more facsimile related packets without interfering with the facsimile transmission.

16. The device according to claim 12, wherein the controller is responsive to the clock skew detector to increase or decrease a rate at which facsimile transmission packets are sent or received to compensate for mismatches in a relative packet rate between the packet switched network interface and the another facsimile transmission processing device.

17. A method for synchronizing nodes in a packet switched network that are participating in a facsimile transmission, comprising:
monitoring performance of the packet switched network;
determining one or more of a facsimile transmission phase or parameter value; and
modifying a jitter buffer size in a participating node based on the performance of the packet switched network in conjunction with an availability for modifying the jitter buffer size determined from the one or more facsimile transmission phase or parameter value.

18. The method according to claim 17, further comprising:
measuring clock skew at the participating node.

19. The method according to claim 17, further comprising:
determining one or more of a facsimile transmission direction, a modulation method, an error correction mode or an image compression method in use.

20. A method for synchronizing nodes in a packet switched network that are participating in a facsimile transmission, comprising:
measuring clock skew at a participating node;
determining one or more of a facsimile transmission phase or parameter value; and
inserting or removing data in a data stream involved in the facsimile transmission in the packet switched network based on a magnitude of clock skew in conjunction with an availability for inserting or removing data in the data stream determined from the one or more facsimile transmission phase or parameter value.

* * * * *